United States Patent [19]

Nakajima et al.

[11] Patent Number: 4,823,737
[45] Date of Patent: Apr. 25, 1989

[54] EGG TRANSFER DEVICE

[76] Inventors: Hideo Nakajima; Minoru Yamamoto, both of 33, Shinonoi Ai, Nagano, 388, Japan

[21] Appl. No.: 87,253
[22] PCT Filed: Dec. 8, 1986
[86] PCT No.: PCT/JP86/00622
  § 371 Date: Aug. 7, 1987
  § 102(e) Date: Aug. 7, 1987
[87] PCT Pub. No.: WO87/03567
  PCT Pub. Date: Jun. 18, 1987

[30] Foreign Application Priority Data

Dec. 9, 1985 [JP] Japan .................................. 60-276632

[51] Int. Cl.4 ............................................. A01K 45/00
[52] U.S. Cl. .......................................... 119/22; 119/48
[58] Field of Search ................. 119/22, 45 R, 48 R; 198/468.8, 469.1

[56] References Cited

U.S. PATENT DOCUMENTS

| | | | |
|---|---|---|---|
| 2,987,038 | 6/1961 | Cole | 119/22 X |
| 3,134,359 | 5/1964 | Byrnes | 119/48 |
| 3,626,905 | 12/1971 | Giesbert et al. | 119/48 |
| 3,770,107 | 11/1973 | Michelbach | 119/48 X |
| 4,199,051 | 4/1980 | Kimberley | 119/48 X |

FOREIGN PATENT DOCUMENTS

| | | |
|---|---|---|
| 38-28513 | 12/1963 | Japan . |
| 47-4253 | 2/1972 | Japan . |
| 53-4303 | 2/1978 | Japan . |
| 53-46233 | 11/1978 | Japan . |
| 58-137619 | 9/1983 | Japan . |
| 60-148819 | 8/1985 | Japan . |

Primary Examiner—Robert P. Swiatek
Attorney, Agent, or Firm—Birch, Stewart, Kolasch & Birch

[57] ABSTRACT

This invention relates to an egg transfer device capable of collecting and transferring eggs delivered from cages without breaking the eggs. Egg collecting shelves are suspended swingably on an endless strip. Eggs are received at a receiving section of the egg collecting shelves and discharged at a discharge section. The receiving section of the egg collecting shelf, the holding section, and the discharge section are all formed with fork-shaped comb-like teeth. The capability of the egg collecting shelves to swing freely causes no eggs transferred by the egg collecting shelves to be cracked or broken. Scraping-out pieces are provided to facilitate eggs to be sent onto the egg collecting stand when the egg collecting shelf has reached the discharge position. Moreover, a stopper mechanism is provided to stop the endless strip when contaminants, if brought onto the discharge section, have disabled the discharge of eggs from the egg collecting shelf.

7 Claims, 7 Drawing Sheets

EGG TRANSFER DEVICE

FIELD OF THE INVENTION

This invention relates to an egg transfer device for collecting eggs such as hen's eggs which are delivered by an egg collecting belt from one- or multi-storied cages to one position.

BACKGROUND TECHNOLOGY

No difficulty is experienced in the transfer of eggs in the horizontal direction. Systems have been developed in which eggs placed on a horizontal transfer path are sent onto an inclined or vertical transfer path to be collected to an egg collecting stand, etc. positioned at a different height from the horizontal transfer path. Transfers in directions other than the horizontal have been difficult to carry out smoothly, often resulting in the breaking of the eggs. The need for inclined or vertical transfer between locations of different heights is a requirement to the poultry farming industry using multi-storied cages intended for receiving eggs.

A poultry farm using the multi-storied cage type hen house will be described as an example. Eggs borne by hens fed in each cage come out of each cage onto an egg collecting conveyer positioned along each cage for horizontal transfer and are sent to one section in the hen house. In this section the eggs are transferred to an egg collecting stand, etc. by means of an transfer device.

A conventional transfer device is shown in FIG. 8.

An egg collecting conveyer 1 is provided along cages 6. In a transfer device 2, a belt 4 is applied taut between an upper pulley 3a and an lower pulley 3b and projection-like mounting pieces 4a are provided on the belt 4 at prescribed intervals. Eggs are eventually collected on an egg collecting stand 5.

Mounting levers 6 in the shape of comb teeth are provided both at the front end of the egg collecting conveyer 1 and at the front end of the egg collecting stand 5.

Eggs delivered by the egg collecting conveyors 1 are put onto the mounting levers 6 and scooped and transferred by the projection-like mounting piece 4a on the belt 4 while turning.

At the top position of the belt 4 where the belt 4 is inverted from the cage side to the side of the egg collecting stand 5 (from up to down), each egg of the mounting piece rolls from the projection-like mounting piece 4a ascending to the projection-like mounting piece 4a descending to be held, and then received by the mounting lever 6 of the egg collecting stand 5.

The above transfer device 2 has a disadvantage that, during the inversion of the direction of the belt 4 from up to down, each egg rolls to the advancing projection-like mounting piece 4a, sometimes causing eggs to collide so strongly as to be cracked. This disadvantage cannot be avoided even if the projection-like mounting piece 4a is constructed to be U-shaped.

An inclined conveyor is disadvantageous in that it requires a large space for positioning the conveyor.

Eggs received by the mounting lever 6 of the egg collecting stand 5 are expected to roll down the inclined mounting piece 6 onto the egg collecting stand 5. However, some of the eggs will stay on the mounting lever 6 or will not roll forth on the egg collecting stand 5. In such a case, the next descending projection-like mounting piece 4a will hit the egg staying on the mounting lever 6. In addition, the eggs succeedingly received by the mounting lever 6, while rolling on the egg collecting stand 5, may collide with one another with the possible generation of cracks developing in the eggs.

OBJECTS OF THE INVENTION

The object of this invention is to provide an egg transfer device in which egg collecting shelves are suspended swingably at regular intervals on endless stripes circulating in a vertical plane. With this structure, the egg collecting shelf with eggs mounted thereon, even while the endless strip changes its movement direction from the ascending to descending side, will not change its axis direction under the weight of the eggs mounted (and the egg collecting shelf itself).

Another object is to provide an egg transfer device in which eggs are received in the ascending side and discharged in the descending side and in which eggs are scooped out of the egg collecting shelf at the discharge position of the egg collecting shelf. This device is characterized in that a scraping piece (discharge bar, etc.) which comes over the egg collecting shelf at the discharge position to scrape eggs is spanned between two rotary plates rotatably in the discharge direction of the eggs. The rotary plates are positioned in connection with a rotary mechanism to be synchronized with the movement of the egg collecting shelf.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of this invention will be described in detail by reference to the accompanying drawings.

Figure 1:
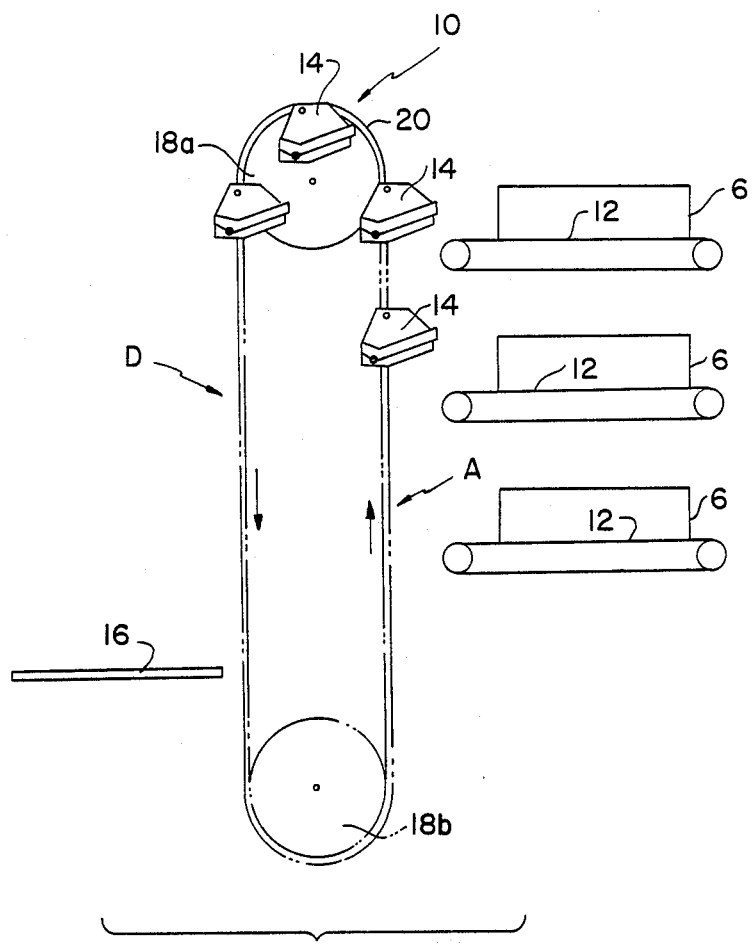
FIG. 1 shows a schematic side view illustrating the entire system including the egg transfer device.
Figure 2:
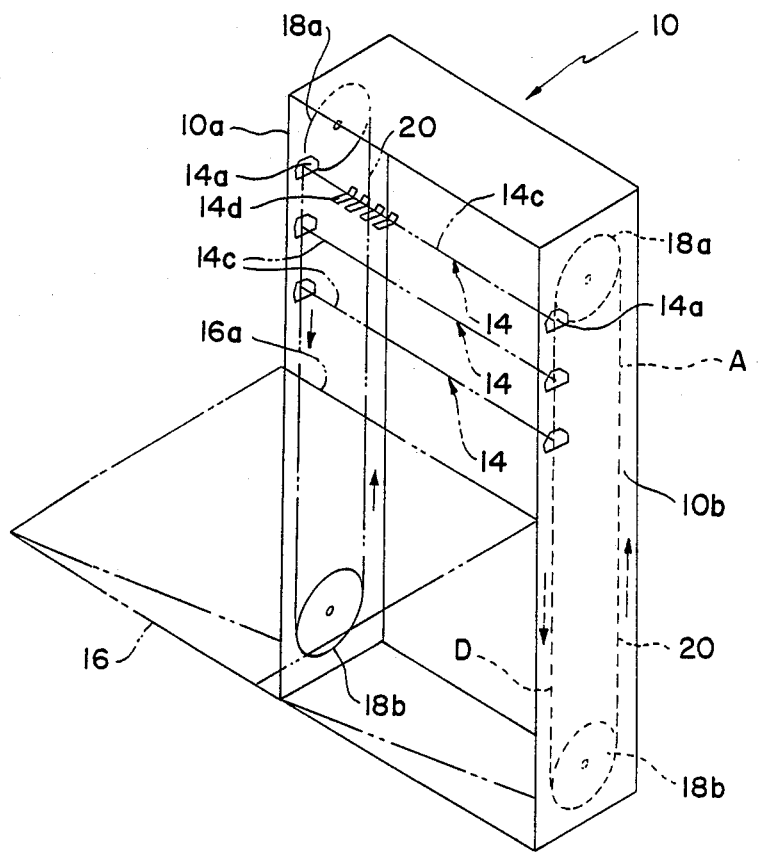
FIG. 2 shows a schematic perspective view of the transfer device.
Figure 3:
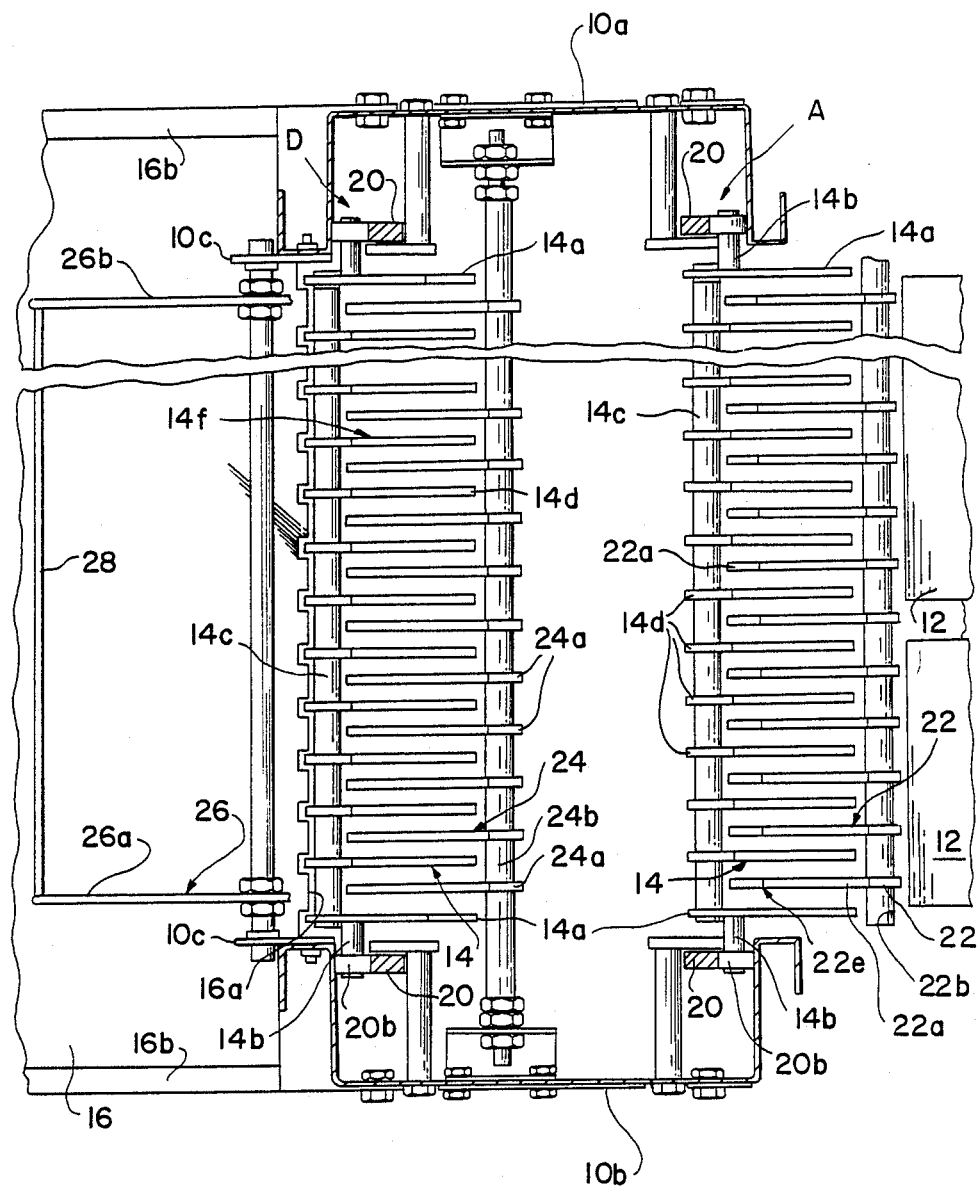
FIG. 3 shows a cross-sectional plan view of the transfer device.

FIG. 1 shows a schematic view of an overall mechanism including an egg transfer device, FIG. 2 shows a schematic perspective view of the transfer device, and FIG. 3 shows a plan view of a cross section showing the overall system.

An egg collecting belt 12 is provided along each cage. This embodiment refers to a cage having three stories. Eggs delivered by this egg collecting belt 12 are transferred to an egg collecting stand 16 by egg collecting shelves 14 on a transfer device 10.

The structure of the transfer device 10 will be described below.

As shown in FIG. 2, a pair of side walls 10a and 10b are provided vertically, and two pairs of sprockets 18a and 18b are placed at the upper and lower end sections of each side wall 10a and 10b. Each of chains 20 and 20 are endless chains which are provided taut on each pair of the sprockets 18a and 18b. The egg collecting shelves 14 are spanned between the chains 20, 20.

As illustrated in FIG. 2, each egg collecting shelf 14 includes side plates 14a and 14a (described later) and only a part of shelf pieces 14d. A coupling rod 14c is also illustrated by a one-dot-chain line.

Figure 4:
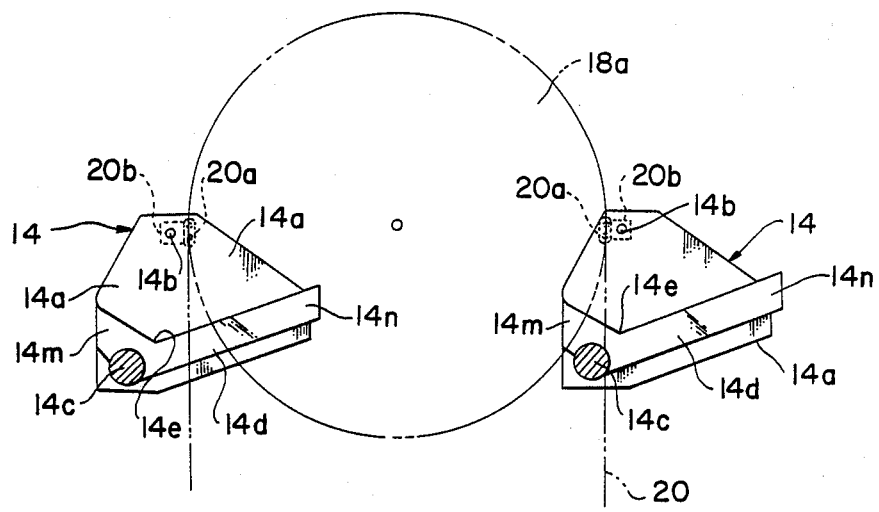
FIG. 4 shows a schematic side view of the upper sprocket section of the transfer device.

As best illustrated in FIG. 4, a chain piece 20a at a suitable position on the chain 20 has an attaching plate 20b provided thereon. The attaching plate 20b is rotatably attached to a hanging shaft 14b which projects from the side plate 14a of the egg collecting shelf 14. Therefore, the egg collecting shelf 14 is capable of freely swinging about the hanging shaft 14b.

Next, the structure of the egg collecting shelf 14 will be described.

As illustrated in FIGS. 3 and 4, two side plates 14a and 14a are connected to each other by a coupling rod 14c at a forward lower portion thereof. The coupling rod 14c has a plurality of shelf pieces 14d fixed at regular intervals. The shelf piece 14d includes two inclined sections 14m and 14n formed in a V-shape with a plurality of concave sections 14e, opening upward, constituting a receiver 14f for holding an egg; one inclined section 14m is shorter than the other 14n and is connected to the coupling rod 14c.

An imaginary line connecting the deepest point of the receiving sections 14e and a hanging shaft 14b which suspend the egg collecting shelves 14 is lined vertically to stabilize the egg collecting shelves 14.

In the right-hand section of FIG. 3 the ascending side A of the egg collecting shelf 14 is illustrated wherein eggs delivered by the egg collecting belt 12 are scooped by the egg collecting shelf 14 while ascending.

The scooping by the egg collecting shelf 14 is carried out as follows. Eggs delivered by the egg collecting belt 12 are put on an egg holding section 22, which is located at the forward end of the egg collecting belt 12 and which is composed of a plurality of holding pieces 22a fixed in parallel with one another at regular intervals. The holding piece 22a is a thin plate of the same shape as the shelf piece 14d and is fixed, with a concave section 22e directed upwardly, on a fixing rod 22b at the forward end of the egg collecting belt 12. The shelf piece 14d is designed to pass through the gap between the holding pieces 22a of the holding section 22, with no contact of the holding piece 22a with the shelf piece 14d. Thus, an egg placed in a concave section of the holding section 22 formed by a plurality of the concave sections 22e of the holding piece 22a is scooped up by the shelf piece 14d during the passage of the egg collecting shelf 14; the coupling rod 14c of the egg collecting shelf 14 and the fixing rod 22b fix the back ends of the shelf piece 14d and holding piece 22a, respectively, so that the egg collecting shelf 14 may scoop up eggs with no contact with the holding section 22.

Figure 5:
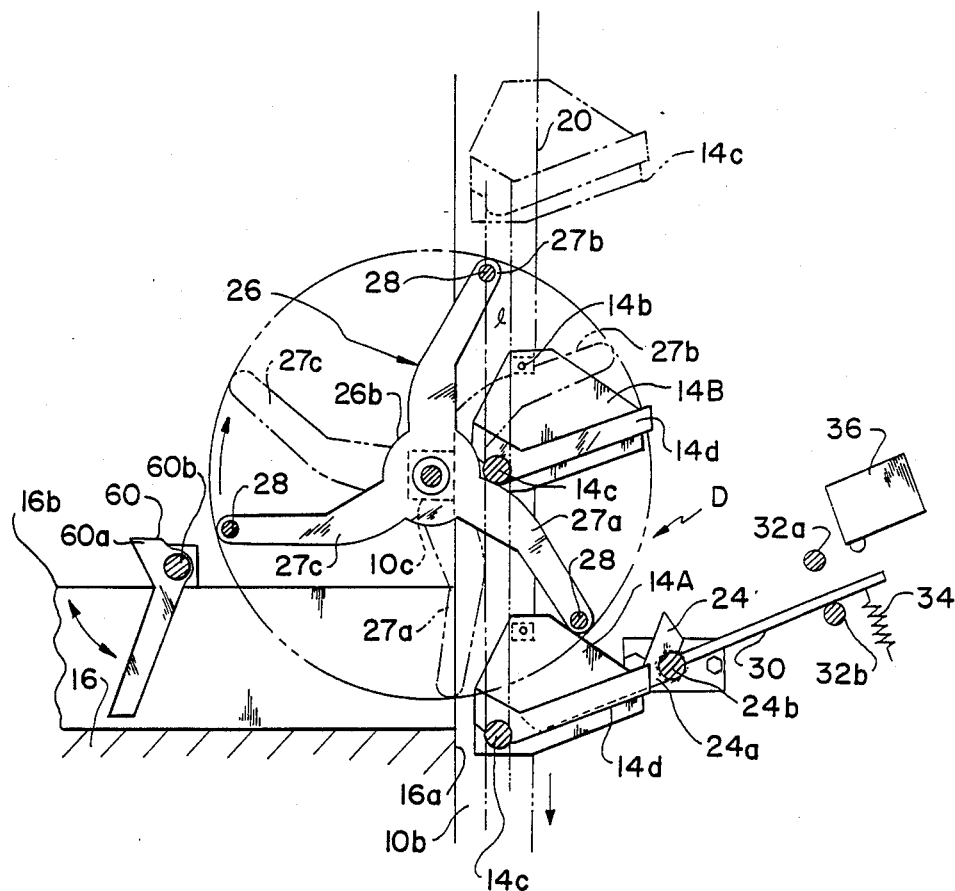
FIG. 5 shows a side view of the discharge section of the transfer device.

The left-hand side of FIG. 3 illustrates the descending side D of the egg collecting shelf 14. By reference to FIGS. 3 and 5 a description will be made of the egg discharging mechanism.

At a short distance from the front edge 16a of the egg collecting stand 16 there is a line of a plurality of inclined pieces 24a which elevate with increasing distance from the egg collecting stand 16, and which are fixed on a supporting rod 24b having its upper end section spanned on both the walls 10a and 10b of the transfer device 10. The inclined pieces 24a and the supporting rod 24b constitute a discharge section 24.

As the egg collecting shelf 14 passes through the discharge section 24, i.e., each shelf pieces 14d of the egg collecting shelf 14 passes between the inclined piece 24a of the discharge section 24, the eggs on the egg collecting shelf 14 are scooped up by the inclined pieces 24a and are caused to roll down the slope formed by the inclined pieces 24a onto the egg collecting stand 16.

Next, a description will be made of the control mechanism for stopping the transfer device 10. The discharge section 24 has a stopper bar 30 extending from the side of the supporting rod 24b. Near the end of the stopper bar 30, two control pieces 32a and 32b are provided to define the rotation range of the discharge section 24 about the supporting rod 24b. The end of the stopper bar 30 is pulled down by a spring 34 against the lower control piece 32b to limit the rotation range of the discharge section 24. In case any contaminants such as feathers of the hens are on the discharge section 24, the egg collecting shelf 14 which is descending cannot pass through the discharge section 24. This causes the discharge section 24 to be pushed down. At that time, the discharge section 24 is forced to rotate against the force of the spring 34, and the stopper bar 30 hits a switch 36. The switch 36, when activated, will stop the egg collecting shelf 14. This is a known electrical mechanism.

A rotary plate 26 is rotatably held on a fixing plates 10c and 10c projecting from the front edges of each of the side walls 10a and 10b. The rotary plate 26 has three arms 27 extending radially. The arms 27a, 27b and 27c on the pair of rotary plates 26a and 26b facing each other have discharge bars 28 spanned between their ends. The dashed line in FIG. 5 indicates the circular locus of the end of the arms 27.

One arm 27a of the rotary plate 26 will be positioned to extend into the space formed between the egg collecting shelf 14A at the discharge position and the overhead egg collecting shelf 14B. As this egg collecting shelf 14B descends, the coupling rods 14c exert a pressure on the base section of the arm 27a, causing the rotary plate 26 to rotate. The arm 27a is then pushed (outward) toward the egg collecting stand 26 in the direction of egg discharge over the locus l of the coupling rod 14c (in FIG. 5 the rotational locus of the arm 27a is indicated by a dashed line). At the same time, the discharge bar 28 sweeps the space immediately over the egg collecting shelf 14A at the discharge position or the inclined piece 24a. The next arm 27b in turn comes into the space over the descending egg collecting shelf 14B (in FIG. 5 the rotational locus of the arm 27b is indicated by the dashed line). Similarly in sequence, the egg collecting shelves 14C, etc. descend, causing the rotary plate 26 to rotate.

Side walls 16b and 16b are provided vertically on the side edges of the egg collecting stand 16, a rod 60b is hung on the side walls 16b and 16b, and swing pieces 60a are suspended from the rod 60b swingably toward the egg collecting stand 16, thus constituting a nonreturn section 60.

The swing piece 60a is designed to be capable only of swinging in the direction of discharging the eggs. Therefore, an egg discharged from the egg collecting shelf 14 is allowed, under the action of the discharge bar 28, to roll on the egg collecting stand 16 over the nonreturn section 60, i.e., out of the sweep space of the discharge bar 28, with no possibility to return.

Now, a description will be made of the action of the egg transfer device with the above-described structure.

Eggs delivered by the egg collecting belt 12 are caused to roll down and settle in the concave sections 22e of the holding pieces 22a in the holding tables 22.

The shelf pieces 14d of the ascending egg collecting shelf 14 pass between the holding pieces 22a of the holding tables 22, during which passage the eggs are scooped up by the shelf pieces 14d.

The egg collecting shelf 14 is capable of passing the upper sprocket 18a followed by descent without inversion, since the egg collecting shelf 14 is attached swingably to the chain piece 20a by the hanging shaft 14b, with weight balance maintained.

While the descending egg collecting shelf 14 passes the discharge position, i.e., the shelf pieces 14d pass between the inclined pieces 24a of the discharge section 24, the eggs are scooped up by the inclined pieces 24a. The slopes formed by the inclined pieces 24a are descendent toward the egg collecting stand 16 so that the eggs having been scooped on the inclined pieces 24a are caused to roll onto the egg collecting stand 16. At the same time, the arm 27a of the rotary plate 26 enters the space between the egg collecting shelf 14A at the discharge position and the egg collecting shelf 14B immediately overhead to the shelf 14A, the coupling rod 14c of the egg collecting shelf 14B pushes down the arm 27a, and the discharge bar 28 sweeps the space over the inclined pieces 24a, thus causing any eggs, if staying on the inclined pieces 24a or between the inclined pieces 24a and the egg collecting stand 16, to roll onto the egg collecting stand 16. Egg discharge from the egg collecting shelf 14 is continued in the same way.

The eggs allowed to roll onto the egg collecting stand 16 push up the swing piece 60a of the nonreturn section 60 to pass the nonreturn section 60, never to be returned.

The eggs collected on the egg collecting stand 16 are accommodated in boxes as required.

Figure 6A:
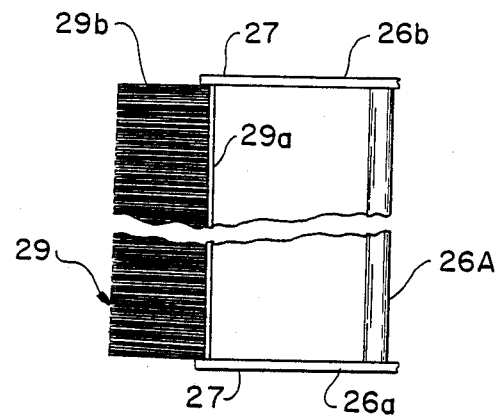
FIGS. 6(a) and (b) show a plan and a cross-sectional side views, respectively, of other scraping pieces.

In the above embodiment, the discharge bar 28 is provided as a scraper at the ends of arms of the rotary plates 26a and 26b. However, instead of the discharge bar 28, a brush 29 formed by positioning coarse hairs 29b on a platelike base 29a may be attached as shown in FIG. 6(a) so as to sweep (scrape) over comb teeth or inclined pieces.

Figure 6B:
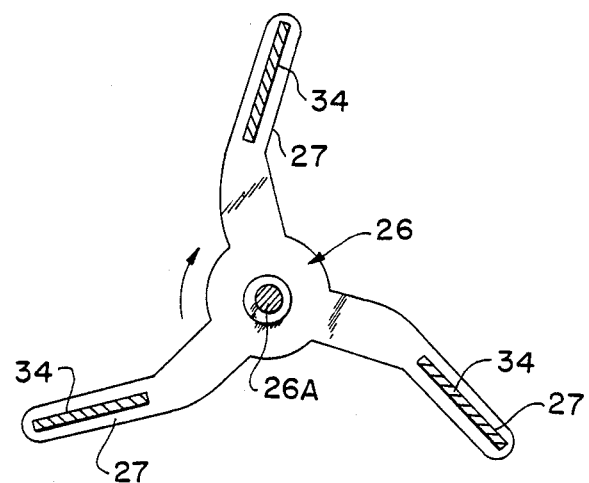

Alternatively, as shown in FIG. 6(b), a plate piece 34 may be set on the arm 27 along its front end section so as to scrape out eggs. Various shape modifications may be applied on the plate piece 34, such as a plate piece having through-holes bored suitably or formed in a net; the number of arms 27 may also be varied suitably.

In the above embodiment, the synchronous rotation of the rotary plate with the movement of the egg collecting shelf 14 is effected by the use of the coupling rod 14c of the egg collecting shelf 14. However, the rotary plate may be driven by a separate driving source. The inclined piece 24a of the discharge section 24 does not need to always be inclined. The scraping out of eggs is possible by use of scraping pieces.

When contaminants such as hen's feather are positioned on the inclined pieces 24a, the descending egg collecting shelf 14 will push down the discharge section 24. This causes the discharge section 24 to rotate against the force of the spring 34 about the supporting rod 24b until the stopper bar 30 activates the switch, with resulting stop of the egg collecting shelf 14. After this stop the contaminants are to be removed.

Figure 7:
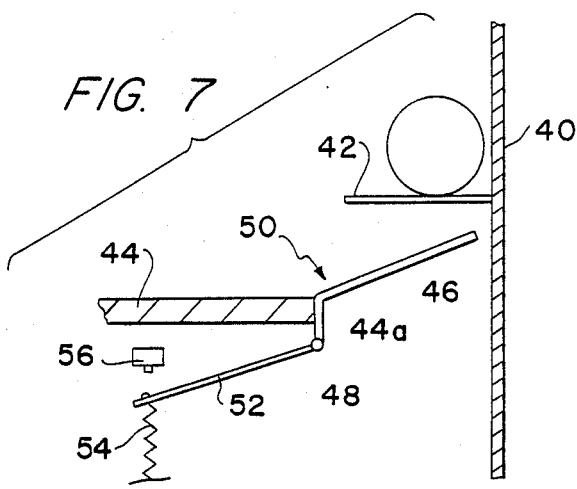
FIG. 7 shows a cross-sectional side view illustrating the stopper mechanism.
Figure 8:
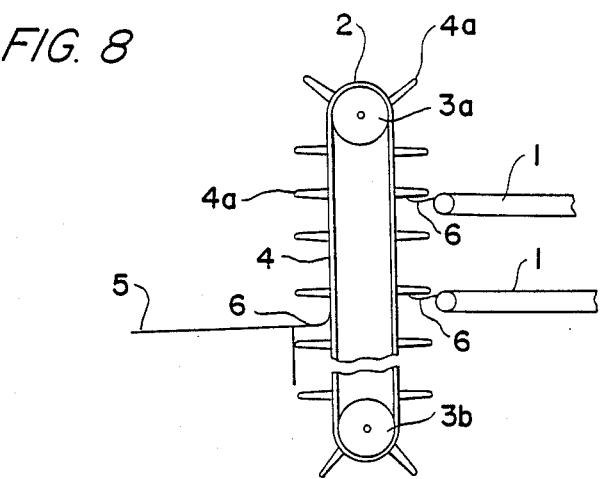
FIG. 8 shows a schematic side view of a conventional egg transfer device.

FIG. 7 shows another embodiment for the control mechanism.

A belt 40 has a plurality of holding pieces 42 projecting like comb teeth, and eggs are mounted on the holding pieces 42.

A plurality of discharge pieces 46 are provided on the front edge 44a of an egg collecting stand 44 with ascending inclination. On the other hand, each discharge piece 46 extends down vertically along the front edge 44a until it is supported rotatably by a supporting rod 48. Thus, providing a discharge section 50.

A stopper bar 52 extends from the discharge section 50 and is pulled by a spring 54. The force of this spring 54 maintains every discharge piece 46 in contact with the front edge 44a of the egg collecting stand 44, thus maintaining the state of slope. The rotation of the discharge section 50 by the existence of any contaminants causes the stopper bar 52 to actuate a switch 56. This arrangement results in the same action and effect as the preceding embodiment.

This invention affords a number of remarkable advantages. Since egg collecting shelves are attached swingably on an endless stripe, no inversion of the egg collecting shelves occurs and accordingly no collision, etc. among eggs takes place to cause eggs to be cracked or broken while the egg collecting shelves deliver to the discharge position the eggs which they have scooped up at the holding section. In addition, the endless stripe may be positioned vertically, thus only a small space is required for setting. Further, the control mechanism may be activated to stop the transfer device when contaminants have been brought onto the discharge or receiving section so that no transfer of eggs may be performed, no breakage of the eggs will occur in the discharge section or the receiving section. Finally, the positioning of the egg collecting shelf at the discharge position may be accompanied with a scraping-out of eggs, thus the discharge of eggs may be facilitated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An egg transfer device for transferring eggs comprising:

sidewalls disposed a predetermined distance apart;

an endless member operatively secured to each of said sidewalls for movement from a first elevation to a second elevation;

drive means for imparting movement to said endless member, said movement defining an ascending section and a desending section of movement of said endless member;

a plurality of coupling rods extending between said sidewalls;

a plurality of egg collecting shelves each having a plurality of approximately V-shaped egg collecting shelf pieces arranged in a spaced apart relationship to form comb-like teeth, each egg collecting shelf being operatively connected to one of said plurality of coupling rods;

a plurality of hanging shafts secured to each of said endless members, each egg collecting shelf being operatively connected to one of said plurality of hanging shafts on each of said endless members for mounting each of said egg collecting shelves for swinging movement relative to said endless members for maintaining the same disposition as said egg collecting shelf is moved from said first elevation to said second elevation;

said plurality of V-shaped shelf pieces forming a concave surface for receiving an egg and retaining the egg in a predetermined disposition during travel from said first elevation to said second elevation;

a holding section located adjacent to said ascending section of said endless member, said holding section including a plurality of holding pieces arranged in a spaced apart relationship to form comb-like teeth capable of passing between the comb-like teeth of said egg collecting shelves for transferring eggs to said egg collecting shelves; and a discharge section located adjacent to said descending section of said endless member, said discharge section including a plurality of discharge pieces arranged in a spaced apart relationship to form comb-like teeth capable of passing between the comb-like teeth of said egg collecting shelves for transferring eggs from said egg collecting shelves;

wherein eggs transferred to said collecting shelves from said holding section are maintained in a predetermined disposition on said V-shaped shelf pieces during travel from said holding section to said discharge section by the swinging movement of each of said egg collecting shelves about each said hanging shaft.

2. The egg transfer device according to claim 1, wherein said endless member is a chain.

3. The egg transfer device according to claim 1, wherein each of said egg collecting shelves further includes a first side plate affixed to one end of said coupling rod and a second side plate affixed to the other end of said coupling rod, said hanging shafts being operatively connected to said first and second side plates for swingably mounting each of said egg collecting shelves relative to said endless members.

4. The egg transfer device according to claim 1, and further including control means for sensing the presence of an existing contaminant at said receiving station and said discharge station for disabling said drive means.

5. The egg transfer device according to claim 1, and further including a scraping means for sweeping over each egg collecting shelf at said discharge section, said scraping means including a first end and a second end, said first end being operataively connected to a first plate and said second end being operataively connected to a second plate, said first and second plates being driven by a rotary mechanism in synchronism with said drive means.

6. The egg transfer device according to claim 5, wherein each rotary plate includes arms extending radially from a center thereof, said scraping means spanning the distance between said arms of said first and second rotary plates.

7. The egg transfer device according to claim 1, and further including a swing piece movable only in the direction of egg discharge for forming a nonreturn section for preventing discharged eggs from returning to said egg collecting shelf.

* * * * *